United States Patent [19]

Therond et al.

[11] Patent Number: 4,669,060

[45] Date of Patent: May 26, 1987

[54] DEVICE ASSOCIATED TO A COMPUTER FOR CONTROLLING DATA TRANSFERS BETWEEN A DATA ACQUISITION SYSTEM AND AN ASSEMBLY COMPRISING A RECORDING AND READING APPARATUS

[75] Inventors: Jean-Francois Therond, Neuilly S/Seine; Jacques Cretin, Le Chesnav, both of France

[73] Assignees: Institut Francais du Petrole, Rueil-Malmaison; Compagnie Generale de Geophysique, Massy, both of France

[21] Appl. No.: 864,362

[22] Filed: May 19, 1986

Related U.S. Application Data

[63] Continuation-in-part of Ser. No. 476,294, Mar. 17, 1983, abandoned.

[30] Foreign Application Priority Data

Mar. 17, 1982 [FR] France .............................. 82 04670

[51] Int. Cl.$^4$ ........................ G06F 3/06; G06F 13/00; G06F 9/00
[52] U.S. Cl. .................................................. 364/900
[58] Field of Search ... 364/200 MS File, 900 MS File, 364/518; 340/825.15, 825.06; 377/2; 370/53, 42

[56] References Cited

U.S. PATENT DOCUMENTS

| | | | |
|---|---|---|---|
| 3,268,870 | 8/1966 | Chalker, Jr. et al. | 364/900 |
| 3,530,438 | 9/1970 | Mellen et al. | 364/200 |
| 3,560,934 | 2/1971 | Ernst et al. | 364/200 |
| 3,582,903 | 6/1971 | Verdier | 364/200 |
| 3,675,209 | 7/1972 | Trost et al. | 364/200 |
| 3,810,103 | 5/1974 | Ricci | 364/900 |
| 4,006,465 | 2/1977 | Cross et al. | 364/200 |
| 4,103,328 | 7/1978 | Dalmasso | 364/200 |
| 4,263,650 | 4/1981 | Bennett et al. | 364/200 |
| 4,486,826 | 12/1984 | Wolff et al. | 364/200 |

Primary Examiner—Archie E. Williams
Assistant Examiner—William G. Niessen
Attorney, Agent, or Firm—Millen & White

[57] ABSTRACT

A device is provided, associated with a computer, for controlling data transfers between a data acquisition device and a recorder-reader. The device comprises logic gates for the selective connection of said acquisition device with said recorder and an intermediary memory of sufficient capacity for at least one series of signals issued from the computer. The device is adapted to supply said signals to the control inputs of said logic gates.

5 Claims, 3 Drawing Figures

DEVICE ASSOCIATED TO A COMPUTER FOR CONTROLLING DATA TRANSFERS BETWEEN A DATA ACQUISITION SYSTEM AND AN ASSEMBLY COMPRISING A RECORDING AND READING APPARATUS

This application is a continuation-in-part of U.S. patent appln. Ser. No. 476,294, filed Mar. 17, 1983, now abandoned.

BACKGROUND OF THE INVENTION

This invention has as an object to provide a device associated with a computer for the control of data transfer between a data acquisition system and an assembly of apparatuses comprising a recording and reading apparatus.

More particularly, the invention has as an object to provide device associated with a computer for controlling direct transfers of informations between a data acquisition system, a recording and reading apparatus (a high-speed tape unit, for example) and, optionally, means for operating recorded data, (for example a processing device), and/or the computer memory.

As will be made apparent during the description, data transfer between a data recording and reading device and another device are generally controlled by a computer whose own memory is used as memorization-relay member. The management of these transfers is assigned to a specialized coupling member usually designed as an ADM member (dirct access to the memory) which, upon receipt of an instruction transmitted thereto by the control unit of the computer, orders a sequence of operations necessary for the request transfer.

With such an arrangement, the computer memory becomes encumbered with data being transferred and the central unit thereof must manage the exchanges for which the memory is used as an intermediate memorization member, which limits the processing capacity of the computer and reduces the exchange possiblities between the central unit and its own memory.

SUMMARY OF THE INVENTION

The device according to the invention avoids the above mentioned disadvantages. It comprises coupling means controlled by the computer for managing data transfer operations. The device is remarkable in that it comprises an assembly of logic gates for selectively connecting the data acquistion system with the apparatus of said assembly in response to control signals, and in that the coupling means comprises an element for memorizing at least one series of specific signals issued from computer, said memorization element being adapted to supply its signals to the control inputs of the logic gate assembly.

The device according to the invention provides for direct transfers of data between the data acquisition system, the recording and reading apparatus and, for example, data operating means or memorization means, without the need of a relay-memory internal to the control computer, the latter being used only for ordering or controlling said transfers or for providing previously memorized data.

BRIEF DESCRIPTION OF THE DRAWINGS

Other features and advantages of the invention will appear from the description of a non-limitative embodiment of the device and with reference to the accompanying drawings, wherein.

DETAILED DISCUSSION OF THE INVENTION

Figure 1:
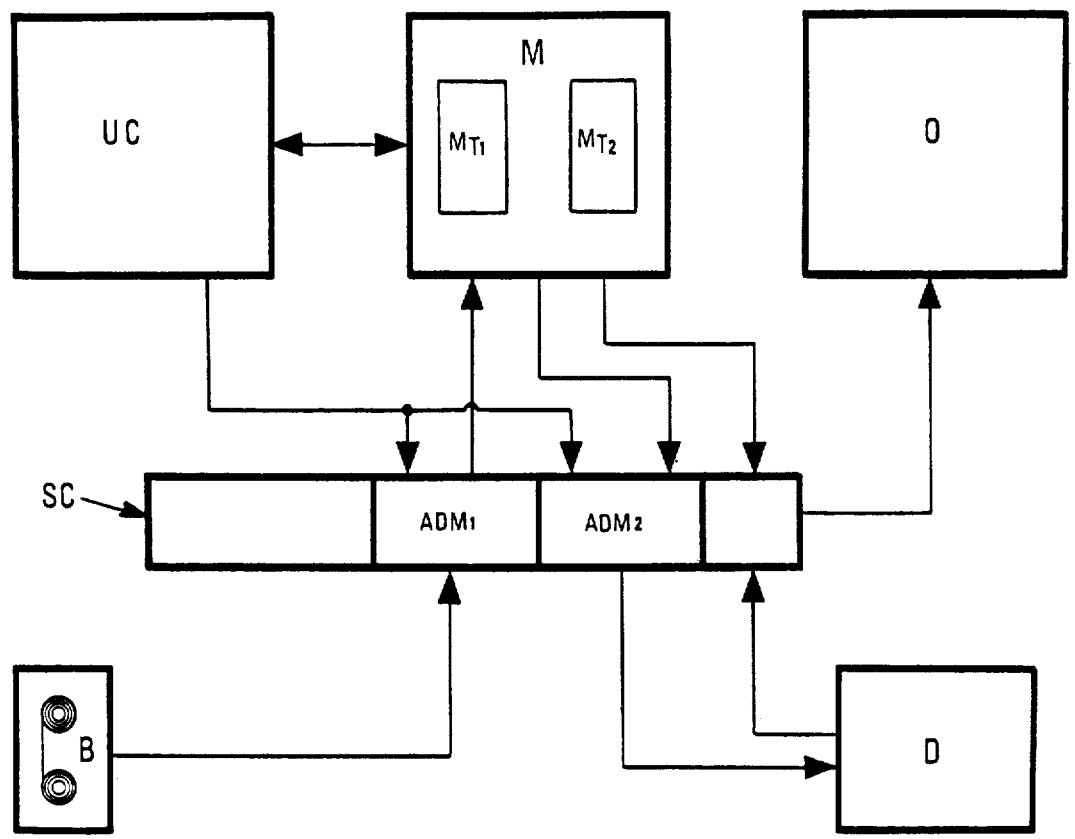
FIG. 1 shows a known device for controlling data transfers between a tape unit and an operator or an auxiliary memorization member, FIG. 2 diagrammatically shows the whole device according to the invention, and FIG. 3 diagrammatically shows a synchronization circuit in accordance with the instant invention.

The known device, shown in FIG. 1, for controlling data transfer between a recording system such as a tape unit B and a using apparatus such as a specialized computing operator O or, optionally, a memorization member, is monitored by a computer comprising a central processing unit UC, associated with a memory M, and a coupling system SC. This system comprises, for example, at least one element $ADM_1$ adapted, upon instruction from the central unit, to order all the transfer operations of information taken from the recorded tape B into a portion of the central memory M of the computer or still, to effect automonously the sequence of several successive transfers. Since the information flow rate read in sequence from the recording magnetic tape is generally very high as compared to the content of the portion of the central memory M assigned to the transferred data, said portion is constituted by two buffer memory elements $MT1$, $MT_2$. When the first element $MT_1$ is full, the central unit UC is warned and orders element $ADM_1$ to continue the data transfer to the second buffer element $MT_2$. Simultaneously the central unit UC gives a transfer instruction to second element $ADM_2$ for having the content of the buffer memory $MT_1$ transferred onto a recording disc D, thus making memory $MT_1$ available for other transfers ordered by the central unit UC. When the information transfers are finished, the central unit orders the transfer of the data memorized in the buffer memories $MT_1$, $MT_2$ of the computer or on the disc, to the specialized operator O.

It appears that the central unit UC of the computer is acting many times during the transfer operations, to initiate the latter, to interchange buffer memories $M_1$, $M_2$, to control element $ADM_1$ and optionally, the other element $ADM_2$, etc. The processing capacity of the central unit is accordingly reduced. In addition, the coupling elements $ADM_1$ and $ADM_2$ have generally a priority access to the computer memory in view of the quick reading of the tape unit and of the length of the data sequences it restitutes. The processing capacity of the computer, which depends on the speed of data exchanges between the central unit UC and the memory M, is also limited since the latter is used for transferring data from a tape unit to an operator making use of said data. Moreover, the transfer between the tape unit and the external operator is made slower as a result of the use of the computer memory as a relay.

Figure 2:
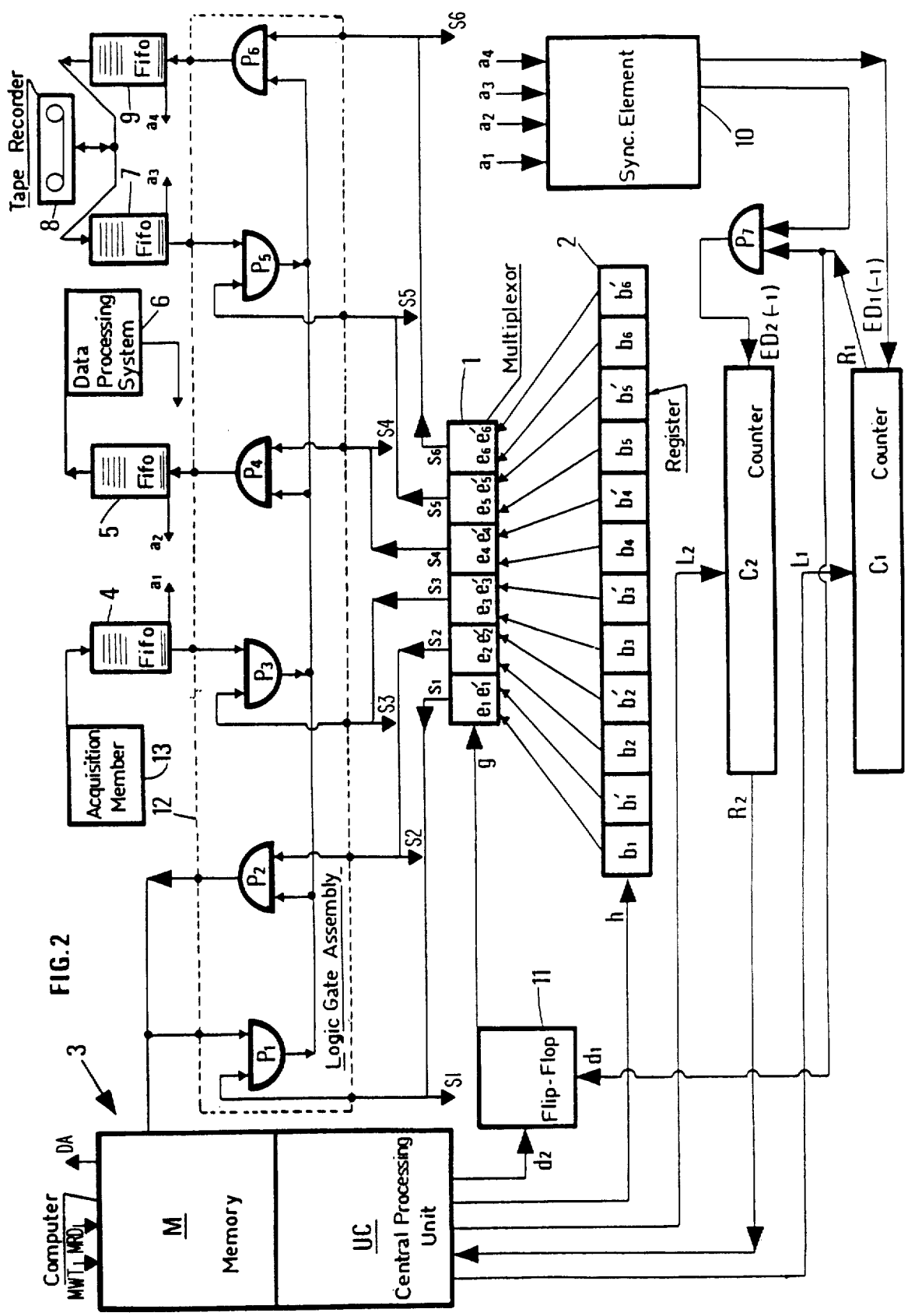

With reference to FIG. 2, it is shown that the device according to the invention comprises a switch member formed of a multiplexer 1 with twelve inputs distributed in a first group ($e_1$, $e_2$, ... $e_6$) and a second group ($e'_1$, $e'_2$, ... $e'_6$) each of six inputs, and six outputs $s_1$, $s_2$, $s_3$ ... $s_6$. This multiplexer is adapted, upon order, to connect the six outputs $s_1$, $s_2$, $s_3$ ... $s_6$ respectively either to the inputs $e_1$, $e_2$, ... $e_6$ of the first group or to the inputs $e'_1$, $e'_2$, ... $e'_6$ of the second group. The twelve inputs e1, $e'_1$, e2, $e'_2$ ... $e'_6$ are respectively connected to the twelve outputs of a memorization element consisting, for example, of a switch register 2 with twelve bits $b_1$, $b'_1$, $b_2$, $b'_2$ ... $b_6$, $b'_6$. The six outputs $s_1$, $s_2$, $s_3$, $s_4$, $s_5$, $s_6$ of multiplexer 1 are connected to a first control input of six AND gates with two inputs $P_1$, $P_2$, $P_4$, $P_5$ and $P_6$, forming the logic gate assembly (12).

The device also comprises a computer (3) made up of the combination of memorization means M and a central processing unit UC. This computer is preferably a microcomputer. A second input of gate $P_1$ and the output of gate $P_2$ are connected to the memorization means M of the micro-computer. A second input of gate $P_3$ is connected to the output of the memorization element (4) of the FIFO type (short term for First-in-First out, well known in the art), the input of said element being connected to an acquisition system 13.

The output of gate $P_4$ is connected to the input of the memorization elements (5) also of the FIFO type, the output thereof being connected to operating means (6) consisting, for example, of a data processing system. A second input of gate $P_5$ is connected to the output of a memorization element (7) of a FIFO type whose input is connected to the output of a data recorder-reader (8), consisting preferably of a high-speed tape reel (reeling velocity of the order of 2 to 3 m/s for example, recording capacity of several thousands bits/cm). The output of gate $P_6$ is connected to the input of a memorization element (9) of the FIFO type whose output is connected to the input of the data recorder (8). The outputs of gates $P_1$, $P_3$ and $P_5$ and the second inputs of gates $P_2$, $P_4$ and $P_6$ are interconnected.

Figure 3:
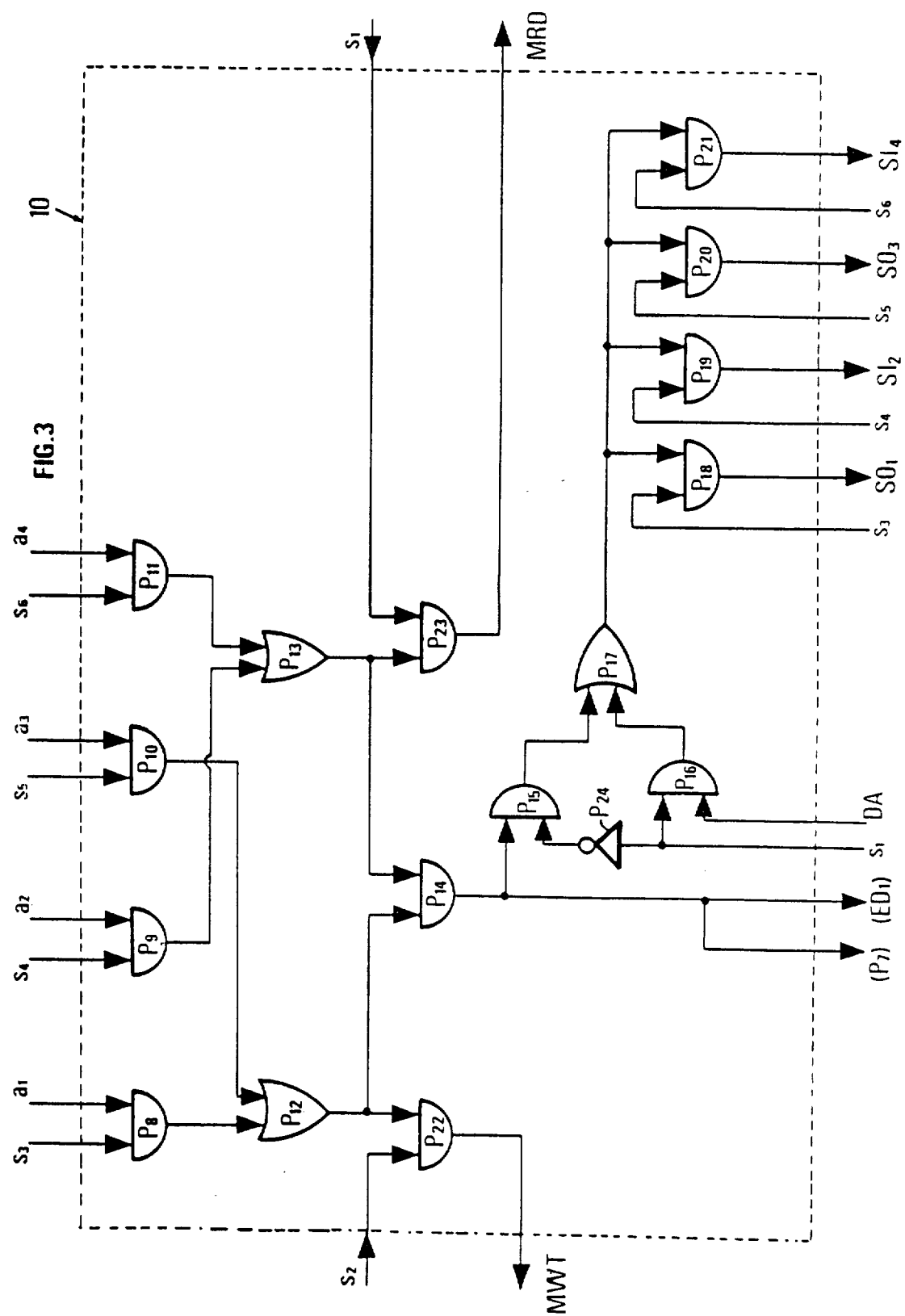

The device also comprises two counters $C_1$ and $C_2$ operating as down-counters whose respective loading inputs $L^1$ and $L_2$ are connected to the central unit UC of the micro-computer 3. The down-counting input $ED_1$ of counter $C_1$ is connected to an output of a synchronization circuit (10). The down-counting input $ED_2$ control input is connected to the "carry" output $R_2$ of counter $C_1$ whose other input is connected to a second output of the synchronization circuit (10). The output $R_1$ of counter $C_1$ is also connected to a first input $d_1$ of a control number (11), a second input $d_2$ thereof being connected to an output of the central unit UC of the micro-computer (3). The output of the control member (11) is connected to the control input g of multiplexer (1). The assembly formed of the memorization element (2), the multiplexer (1), the counters $C_1$, $C_2$, the synchronization element (10), the control member (11) and the gate $P_7$, constitutes the coupling means. The memorization elements of a FIFO type are adapted to generate signals when their memory locations are not all occupied. The respective outputs $a_1$, $a_2$, $a_3$, $a_4$, of the memorization elements 4, 5, 7, 9 where these signals are available and the respective outputs one to six issuing from multiplexor 10, as is shown in more detail in relation to FIG. 3, are connected to the four inputs of the synchronization circuit (10). Finally, the loading input h of register (2) is connected to an output of the central unit UC of the micro-computer (3) and an input thereof is connected to the "carry" output $R_2$ of counter $C_2$.

The device operates as follows:

The multiplexer (1) being in a first position, wherein it connects for example the inputs $e_1$ to $e_6$ respectively to outputs $s_1$ to $s_6$, the central unit UC of the micro-computer (3) loads a digital word with 12 bits into the switching register (2) according to the selected type of transfer. When the data must be transferred, for example, from the tape recorder (8) to the operating device (6), the bits $b_5$ and $b_4$ will have a logic value 1, the other bits of the digital word loaded in the switching register having the logic value 0, so as t open the AND gates $P_4$ and $P_5$ and close the other gates $P_1$ to $P_3$ and $P_6$.

When a series of more complex operations must be effected, for example, the transfer in series of a certain number K of words from the memorization means M of the micro-computer (3) to the tape recorder (8), followed by the transfer in series of a certain number L of words from the acquisition member (13) also to the recorder (8), the central unit UC of the micro-computer (3) initiates these transfers. For this purpose:

it controls the loading in counters $C_1$ and $C_2$ respectively of the two numbers K and L, it loads into the switching register 2 a digital word, such that the bits $b_1$ and $b_6$ on the one hand and $b'_3$ and $b'_6$, be at the high logic level, the other bits being at the low logic level, so as to open in a first stage the AND gates $P_1$ and $P_6$ and, in a second stage, obtained by switching the multiplexer (1), to open gates $P_3$ and $P_6$, it generates the validation signal $d_2$, and it transmits to the associated memorization means M, instructions to designate the addresses of the K words which must be successively extracted and to control their transfer.

In the first stage, where the gates $P_1$ and $P_6$ are open, the K words are transferred to the memorization element (9) and then to the tape recorder (8). As soon as a memory location of element (9) is released, the signal $a_4$ emitted therefrom orders the emission by the synchronization circuit (10) of a down-counting pulse which decrements counter $C_1$. When K successive pulses have reset counter $C_1$ to zero, the latter generates at its output $R_1$ a "carry" signal which controls the opening of the AND gate $P_7$ and actuates the control member (11) which, in turn, emits a control pulse applied to the input g of the multiplexer 1, thereby producing the connection of outputs $s_1$, $s_2$ ... $s_6$ with inputs $e'_1$, $e'_2$ ... $e'_6$ thereof.

In the second stage, the bits $b'_3$ and $b'_6$ being at logic level 1, the AND gates $P_3$ and $P_6$ are open and the requires transfers of L words from the acquisition member (13) to the tape recorder (8) may be serially effected at a rate depending on the availability of locations in the associated memorization elements (FIFO) (4) and (9).

The synchronization circuit (10) is adapted, from signals $a_1$ and $a_4$ for example, to generate pulses which are supplied to the counter input ED 2 of counter $C_2$ through the gate $P_7$ maintained open by the "carry" signal at the output $R_1$ of counter $C_1$. The counter $C_2$ is decremented and the "carry" signal emitted therefrom on its output $R_2$ at its reset to zero, is transmitted to the central unit UC of the micro-computer (3), thereby terminating the required series of transfers.

To obtain a synchronization of exchanges between the various storage elements (Fifo) at a speed dependent on the availability of their memory locations, synchronization element 10 generates conventional logic signals SO (shift out) and SI (shift in) which respectively control, for each of them, the output or extraction of data and the input or entry of data from signals $a_1$, $a_2$, $a_3$, $a_4$, of different bits of binary words available at the outputs S1 to S6 of multiplexer 1, and of a functioning signal of memory M of microcomputer 3, by means of an array of logic gates shown in FIG. 3.

The array of logic gates comprises four AND gates $P_8$, $P_9$, $P_{10}$, $P_{11}$, respectively receiving on a first input signals $a_1$, $a_2$, $a_3$, $a_4$ (see FIG. 2) generated by Fifo storage elements 4, 5, 7 and 9 and on a second input respectively the signals available at outputs S3, S4, S5 and S6 of multiplexer 1. The outputs of AND gates $P_8$ and $P_{10}$ are connected to two inputs of a first OR gate $P_{12}$. The outputs of AND gates $P_9$ and $P_{11}$ are connected to two inputs of a second OR gate $P_{13}$. The respective outputs of the two OR gates $P_{12}$ and $P_{13}$ are connected to two inputs of an AND gate $P_{14}$. The output of the latter is connected to an input of gate $P_7$ and to the countdown input of counter $C^1$ (see FIG. 2). The signal, at the output of AND gate $P_{14}$ is used to allow the output of data of Fifo elements 4 and 7 and the input of data into Fifo elements 5 and 9, to the extent that these various elements are involved in the transfers.

The conditional orders controlling the Fifo elements are generated by applying the available signal at the output of gate $P_{14}$ to a first input of an AND gate $P_{15}$. The signal SI coming from multiplexer 1 is applied to a first input of an AND gate $P_{16}$ and, by an inverter $P_{17}$, to the second input of AND gate $P_{15}$. On the second input of AND gate $P_{16}$ is applied a conventional signal DA (data available) sent by memory M when it is ready to make a data transfer. The outputs of AND gates $P_{15}$ and $P_{16}$ are connected by means of an OR gate $P_{17}$ to a first input of four AND gates $P_{18}$, $P_{19}$, $P_{20}$, $P_{21}$. The second inputs of these latter are connected respectively to outputs S3, S4, S5 and S6 of multiplexer 1. At the outputs of gates $P_{18}$ and $P_{20}$ are available respectively conventional signals $SO_1$ and $SO_3$ controlling the output of data outside of Fifo elements 4 and 7, and at the outputs of AND gates $P_{19}$ and $P_{21}$ are available respectively conventional signals $SI_2$ and $SI_4$ controlling the input of data into Fifo elements 5 and 9.

The outputs of OR gates $P_{12}$ and $P_{13}$ are also connected respectively to a first input of two AND gates $P_{22}$ and $P_{23}$. The second respective inputs of these two gates are connected to outputs S2 and S3 of multiplexer 1. At the output of gate $P_{22}$ is available the conventional signal MWT (memory write) allowing the writing into memory M of data coming from AND gate $P_2$ (see Fig. 2) of the array of logic gates 12. At the output of gate $P_{22}$ is available the conventional signal MRD (memory read) which allows the output of data by AND gate $P_1$ of the array of logic gates 12 (see FIG. 2). In response to this command, memory M generates signal DA (data available) which acts on AND gate $P_{16}$.

This type of operation consisting of linking a first and a second series of words issued from two different memorization members and of transferring them to a common member is used, for example, in seismic data recording systems.

The L digital words are, for example, the values representing a demultiplexed seismic signal contained in the memory of a seismic data acquisition system such as that described in the French Pat. No. 2,471,088. The K digital words represent for example the assembly of data required for the identification of the demultiplexed signal and form the "label" of said signal. when the demultiplexed signal must be transferred into a tape recorder, K words of the "label" are linked in order for the L words of the signal, so as to obtain an identified data block.

The above described example is not limitative. By a suitable loading of the switching register (2) as well as of the counters C1, C2 for example, it is possible to obtain all the possible combinations of transfers between the memorization member M, the acquisition and operating members (6, 13) and the tape recorder (8).

In all cases, it appears that the memorization means of the computer are never used as relays and that the work of the central unit in the management of the different data transfers is limited to initialization orders, so that it can be used for other works.

What is claimed is:

1. A system for linking at least two data transfers between different components of an assembly of different components operable for acquisition, processing, treating and recording of data under control of a data processing unit (UC), comprising a set of logic gates (12) with each gate of the set having a control input, the logic gates selectively controlling transfer of data through interconnecting lines between components of said assembly upon receipt of control binary words whose bits are respectively applied to the control inputs of said logic gates, memory means (2) for the memorization of a series of at least two binary words issued from the processing unit, a commutation unit (1) provided with inputs, outputs and a control input, said inputs connected to the memory means for application thereon of the different bits of the memorized binary words, said control binary words being available at the outputs of said commutation unit, and counting and actuation means connected to said commutation unit for detection of the end of each data transfer and activation of said commutation unit, whereby another binary word of the series is applied to the control inputs of the logic gates.

2. A system according to claim 1, wherein the memorizing means are registers for storing at least two binary words, the different outputs of said register means being applied to the inputs of the communication unit, and wherein said counting and actuation means for detection of the end each data transfer and actuating of the communication unit includes at least a first counter ($C_1$) and a second counter being provided with loading inputs connected to the processing unit for recording the number of separate data words to be transferred in the at least two successive transfers and down-counting inputs for decrementing pulses; the system further including a synchronization element t(10) to generate said decrementing pulses for successively decrementing the first and the second counters; and a logic assembly, actuated by the first counter when the latter is reset to zero, for connection of the synchronization element to the down-counting input of the second counter and for controlling the commutation unit so as to enable the second of the two successive data transfers.

3. A system according to claim 2, wherein the logic assembly includes a validation logic gate ($P_7$) having two inputs, one input receiving each next to zero pulse ($R_1$) from the first counter to the other input receiving decrementing pulses from the synchronization element, an output connected to the down-counting put of the second counter and a control member (11) connected to the next to zero output of the first counter as well as to the processing unit for delivering a signal to control the commutation unit.

4. A system according to claim 2, wherein the assembly of components includes data processing means, a data acquisition system and recording components; the gates of the set of logic gates being connected to said components through buffer memories operative to generate data transfer signals for indicating data transfers, said data transfer signals being transmitted to the synchronization element.

5. A system according to claim 1, wherein the processing unit is a microprocessor and the assembly of components includes a high-speed tape unit connected thereto through the commutation unit.

* * * * *